United States Patent [19]

Hambrecht et al.

[11] Patent Number: 4,788,253

[45] Date of Patent: Nov. 29, 1988

[54] THERMOPLASTIC MOLDING MATERIAL

[75] Inventors: Juergen Hambrecht, Heidelberg; Burghard Schmitt, Worms; Johann Swoboda; Georg Wassmuth, both of Ludwigshafen; Claus Bernhard, Eisenberg; Rudolf Stephan, Ludwigshafen, all of Fed. Rep. of Germany

[73] Assignee: BASF Aktiengesellschaft, Ludwigshafen, Fed. Rep. of Germany

[21] Appl. No.: 627

[22] Filed: Apr. 17, 1987

Related U.S. Application Data

[60] Division of Ser. No. 580,220, Feb. 15, 1984, Pat. No. 4,634,734, which is a continuation-in-part of Ser. No. 446,437, Dec. 3, 1982, abandoned.

[30] Foreign Application Priority Data

Dec. 12, 1981 [DE] Fed. Rep. of Germany ....... 3149358

[51] Int. Cl.$^4$ .................... C08L 33/08; C08L 51/00
[52] U.S. Cl. ........................................ 525/83; 525/82; 525/85
[58] Field of Search .................................. 525/85, 83

[56] References Cited

U.S. PATENT DOCUMENTS 4,634,734  1/1987  Hambrecht et al. ................. 525/85

Primary Examiner—Jacob Ziegler

Attorney, Agent, or Firm—William G. Conger

[57] ABSTRACT

The invention relates to a thermoplastic molding material of an elastomeric polymer A, a shell B grafted to the polymer A, and a copolymer C as rigid matrix. The amount of polymer A is 1 to 25 percent by weight based on the weight of A+B+C. It has a glass transition temperature, Tg, of less than 0° C. and an average particle size of 200 to 750 nanometers ($d_{50}$ value of the integral mass distribution) and is composed of: 50 to 99.9 percent by weight of at least one alkylacrylate with 1 to 8 carbon atoms in the alkyl radical and 0.1 to 5 percent by weight of a polyfunctional monomer which has a crosslinking action. Grafting shell B represents 5 to 40 percent by weight based on A+B+C and is composed of at least one of the monomers of the group of ($b_1$) vinylaromatic monomers, and ($b_2$) the ethylenically unsaturated monomers.

Grafting shell B is prepared in two stages with 30 to 70 percent by weight of the monomers $b_1$ being used in the first stage, and 30 to 70 percent by weight of a mixture of monomers $b_1$ and $b_2$ in a weight ratio of 90:10 to 60:40 being used in the second stage.

Copolymer C is added in an amount of 35 to 94 percent by weight based on A+B+C and consists of a vinylaromatic monomer and an ethylenically unsaturated monomer.

The molding material may contain commonly used additives in effective amounts and is used for the preparation of molded parts.

3 Claims, No Drawings

THERMOPLASTIC MOLDING MATERIAL

This is a division of application Ser. No. 580,220, filed Feb. 15, 1984, now U.S. Pat. No. 4,634,734, which is a continuation-in-part of Ser. No. 446,437, filed Dec. 3, 1982, now abandoned.

FIELD OF THE INVENTION

The invention relates to a thermoplastic molding material of styrene-acrylonitrile polymers, modified to be impact resistant with rubber-like acrylate polymers.

DESCRIPTION OF THE PRIOR ART (1) U.S. Pat. No. 3,055,859
(2) German Patent No. 12 60 135
(3) German Published Application No. 19 11 882 and
(4) German Published Application No. 28 26 925

The preparation of ASA-polymers which are resistant to weathering and aging is described in (1) and (2) mentioned above. According to the descriptions in these patents the rubber-like acrylate polymer serving as the grafting base is initially prepared by emulsion polymerization of acrylates with 4 to 8 carbon atoms. The resultant latex has an average particle diameter in the range of less than 100 nanometers. Subsequently, a mixture of styrene and acrylonitrile is grafted to this polyacrylate latex with the grafting polymerization also being preferably carried out in an emulsion. In order to achieve ASA polymers with good mechanical properties, it was found necessary to have the polyacrylate rubber, which serves as the grafting base, crosslinked; that is, it was found necessary to copolymerize the acrylate with small quantities of bifunctional monomers which have a crosslinking effect. The crosslinking may be uniform, or, as described in German Published Application No. 21 62 485, it may be non-uniform. These products show reduced impact resistance and pronounced intrusion seams [slow seams] when used for injection molding.

Another development of the process known from (2) is described in (3). According to the data in this published application, a "large particle" latex of a cross-linked acrylate polymer with an average particle diameter between 150 and 800 namnometers and a narrow particle size distribution is used as the grafting base for the graft pplymerization. Compared with products produced by using small particle acrylate polymer latices as grafting base, these ASA polymers which were produced with large particle acrylate polymerizate lattices, excel by their improved impact resistance, greater rigidity and reduced shrinkage. Contrary to the ASA polymers based on small particle copolymerized graft polymer mixtures, the ASA polymers based on large particle copolymerized graft polymer mixtures can be used for the manufacture of marginally acceptable colored molded parts because of their poor dyeing properties. If ASA polymers based on large particle copolymerized graft polymer mixtures are dyed, only dull colors with pastel-like character can be achieved but not the brilliant and bright colors without any dulling effect, which are demanded by the market. The impact resistance of these polymers after weathering leaves something to be desired.

In (4) are described ASA polymers with high impact resistance and good dyeing behavior. These properties are achieved by mixing two graft rubbers with different particle sizes. However, the drawbacks of these products continue to be still noticeable flow lines resulting from injection molding and the reduced mechanical level of the molding materials after exposure to weather.

Therefore, the purpose of this invention was to produce weather-resistant products based on ASA polymers, which in addition to the favorable properties of familiar molding materials such as resistance to weathering and aging, rigidity, and stability, not only have a markedly improved impact resistance even after weathering, but furthermore should have good dyeing properties permitting the preparation of molded parts with brilliant, bright colors without flow lines.

These requirements are met by molding materials according to this invention based on a copolymerized graft polymer mixture consisting of a flexible cross-linked polyacrylate core and two grafted shells of styrene and styrene copolymers. It was surprising that the requirements could be met with these materials.

The subject of this invention thus are the thermoplastic molding materials described in claim 1.

Described below are the composition of the molding material and the components and the preparation of the molding material.

DESCRIPTION OF THE PREFERRED EMBODIMENTS

The invention relates to a thermoplastic molding material consisting of (A) 1 to 25 percent by weight based on the weight of A+B+C of at least one elastomeric polymer having a glass temperature, Tg, of less than 0° C. and an average particle size of 200 to 750 nm ( $d_{50}$—value of the integral mass distribution) and which consists of:
  (1) 50 to 99.9 percent by weight of at least one alkyl acrylate having 1 to 8 carbon atoms in the alkyl radical
  (2) 0.1 to 5 percent by weight of a polyfunctional monomer having a crosslinking effect optionally containing
  (3) up to 50 percent by weight of at least one monoethylenically unsaturated monomer and (B) 5 to 40 percent by weight based on the weight of A+B+C of a shell grafted to the elasatomeric polymerizate A with the resulting copolymerized graft polymer mixture of A+B having an average particle size of 200 to 750 nm ( $d_{50}$—value of the integral mass distribution) containing at least one of the monomers selected from the group consisting of
  (1) vinyl aromatic monomers and
  (2) the ethylenically unsaturated monomers, as well as (C) 35 to 94 percent by weight based on the weight of A+B+C of a copolymerizate consisting of
  (1) at least one vinyl aromatic monomer and
  (2) at least one ethylenically unsaturated monomer, and optionally containing (D) commonly used additives in effective quantities, wherein the manufacture of the grafted shell (B) takes place in two stages with 30 to 70 percent by weight of the monomer (B1) being used in the first stage and 30 to 70 percent by weight of a mixture of monomers (B1) and (B2) in a weight ratio of 90:10 to 60:40 being used in the second stage.

Component A

The elastomeric polymers (grafting base) and the grafting shell, that is the mixed graft polymer consisting of A and B, are prepared employing well known methods.

Crosslinked acrylate polymers with a glass transition temperature, Tg below °C, serve as elastomeric rubbers A. The crosslinked acrylate polymers preferably should have a glass temperature below −20° C., particularly below −30° C.

The glass transition temperature of the acrylate polymers can be determined for example in accordance with the DSC method (K.H. Illers, Makromol. Chemie 127 (1969), page 1). Suitable monomers $a_1$ for the preparation of the acrylic acid with 1 to 8 carbon atoms, preferably with 4 to 8 carbon atoms, in the alkyl radical. Examples of alkylesters of acrylate polymers include the n-butylester of acrylic acid and ethylhexylester of acrylic acid. For the preparation of the acrylate polymers serving as the grafting base, these acrylates may be used alone or as mixtures.

In order to obtain crosslinked acrylate polymers, the acrylates are polymerized in the presence of 0.1 to 5 percent by weight, preferably 1 to 4 percent by weight, based on the overall monomers used for the preparation of a grafting base of a copolymerizable polyfunctional, preferably bifunctional monomer $a_2$, which causes the crosslinking. Suitable as such bi or polyfunctional crosslinking monomers $a_2$ are monomers which preferably contain two, possibly even more, ethylenic double bonds which are capable of copolymerization and which are not conjugated in the 1,3 positions. Suitable crosslinking monomers include, for example, divinylbenzene, diallylmaleate, diallylfumarate or diallylphthalate. The acrylate of tricyclodecenylalcohol has proven to be particularly favorable crosslinking monomer (compare German Patent No. 12 60 135).

Optionally the elastomeric polymeric polymer A may also contain up to 50, particularly 20 to 30 percent by weight, of an additional copolymerizable monomer $a_3$ such as butadiene, isoprene, styrene, acrylonitrile, methylmethacrylate and/or vinylmethylether.

The copolymerized graft polymer of A+B is basically known and can be prepared, for example in accordance with the method described in German Patent No. 12 60 135. To begin with the elastomeric polymer grafting base A is produced by polymerizing the acrylate or acrylates $a_1$ and the polyfunctional monomer $a_2$ which causes the crosslinking, optionally together with the additional comonomers $a_3$ in an aqueous emulsion and basically known fashion at temperatures between 20° C. and 100° C., preferably between 50° C. and 80° C. Normally used emulsifiers may be used such as alkali salts of alkyl or alkylarylsulfonic acids, alkylslfates, fatty alcohol sulfonates, salts of higher fatty acids with 10 to 30 carbon atoms, or resin soaps. Preferably used are sodium salts of alkylsulfonates or fatty acids with 10 to 18 carbon atoms. It is advantageous to use the emulsifiers in amounts of 0.5 to 5 percent by weight, particularly 1 to 2 percent by weight, based on the monomers used for the preparation of grafting Base A. Generally a water to monomer ratio of 2:1 to 0.7:1 is employed. Suitable polymerization initiators are particularly the commonly used persulfates such as potassium persulfate. However, Redox Systems may also be used. The initiators are generally used in amounts of 0.1 to 1 percent by weight, based on the monomers used for the preparation of grafting Base A.

Commonly used buffer substance by which pH values of preferably 6 to 9 are achieved, such as sodium bicarbonate and sodium pyrophosphate, as well as 0 to 3 percent by weight of a molecular weight regulator, such as mercaptans, terpinols or dimeric α-methylstyrene, can be used as polymerization auxiliaries.

The detailed polymerization conditions, particularly the type, metering, and amount of emulsifier, are determined within the above-referenced ranges in such a manner that the resultant latex of the crosslinked acrylate polymer has a $d_{50}$ value in the range of approximately 200 to 750 nanometers, preferably in the range of 250 to 450 nanometers. Preferably the particle sizes of the latex should be distributed over a very narrow range. The quotient $Q=(d_{90}-d_{10})/d_{50}$ should be smaller than 0.5, preferably smaller than 0.35.

Component B

In order to prepare the copolymerized graft polymer mixture A+B, a vinyl aromatic monomer $b_1$ with up to 12 carbon atoms is then polymerized in the next step in the presence of the resultant latex of the crosslinked acrylate polymer. Examples of such monomers are styrene, α-methylstyrene and the alkylstyrenes such as para-methylstyrene and tertiarybutylstyrene. Particularly preferred are styrene, α-methylstyrene and para-methylstyrene. It is advantageous to carry out the polymerization of the graft polymer mixture of monomers $b_1$ to the crosslinked polyacrylate polymer which serves as a grafting base in an aqueous emulsion under commonly used above-referenced conditions. The polymerization of graft polymer mixture can advantageously take place in the same system as the emulsion polymerization for the preparation of grafting Base A. If necessary, additional emulsifier and initiator may be added to the mixture. The monomer $b_1$ to be grafted, particularly styrene, can be added to the reaction mixture all at once, in batches, in several stages, or preferably on a continuous base during the polymerization process. The polymerization of the graft polymer mixture of styrene in the presence of a crosslinked acrylate polymer is controlled in such manner that a grafting degree of 2.5 to 25 percent by weight, preferably of 15 to 20 percent by weight, will result in the graft polymer mixture B. The copolymerization of graft polymer mixture with a monomer mixture consisting of at least one vinyl aromatic monomer $b_1$ and at least one copolymerizable polar monomer $b_2$ in a ratio of 90:10 to 60:40, preferably 75:25 to 65:35, is then continued in a second step. Examples of vinyl aromatic monomers $b_1$ were listed for the first grafting stage. Examples of copolymerizable ethylenically unsaturated monomers $b_2$ are acrylonitrile (meth), acrylic or methacrylic acid alkylester with 1 to 4 carbon atoms in the alkyl radical, acrylic acid, maleic anhydride, acrylamide, and/or vinylmethylether. Particularly preferred are acrylonitrile, ethylacrylate, methylmethacrylate, and mixtures thereof. Primarily styrene and acrylonitrile, a-methylstyrene and acrylonitrile, and styrene acrylonitrile and methylmethacrylate are particularly preferred monomer mixtures for the second stage of the grafting process. The second step of the copolymerization of the graft polymer mixture is advantageously also carried out in the same system. If necessary more emulsifier and initiator may be added. The monomer mixture of, for example, styrene and acrylonitrile which is to be grafted can be added to the reaction mixture all at once, in batches, in several steps, or preferably on a continuous basis during the polymerization process. The copolymerization of the graft polymer mixture of, for example, styrene and acrylonitrile in the presence of the crosslinked acrylate polymer is controlled in such a manner that a grafting degree of 10 to 45 percent by weight, preferably of 15 to 40 percent by weight, will result in the copolymerized graft polymer mixture B. The copolymerized graft polymer mixtures should have average particle sizes between 200 and 750 nanometers( $d_{50}$ value of the integral mass distribution). The conditions of the copolymerization of the graft polymer mixture must be selected in such a manner that particle sizes in this range will result. The appropriate measures are known and are described, for example, in German Patent No. 12 60 135 and German Published Application No. 28 26 925.

Component C

In addition to Components A and B, the copolymerized graft polymer mixture, the mixtures according to this invention contain as additional components, C, a rigid component of one or more copolymers of styrene and/or α-methylstyrene with acrylonitrile in an amount of 35 to 94 percent by weight based on A+B+C. The acrylonitrile content in these copolymers of rigid Component C should be 20 to 40 percent by weight, based on the respective copolymer of the rigid component. This rigid Component C also comprises the free ungrafted styrene/acrylonitrile copolymers resulting from the copolymerization of the graft polymer mixture for the preparation of Component B. Depending upon the conditions chosen for the copolymerization for the preparation of the copolymerized graft polymer mixture B, it may be possible that a sufficient amount of rigid Component C is formed during the copolymerization. Generally, however, it will be necessary to mix the products produced by the copolymerization process with additional separately prepared rigid Component C.

This additional separately prepared rigid Component C may be a styrene/acrylonitrile copolymer, an α-methylstyrene/acrylonitrile copolymer,a styrene/methylmethacrylate copolymer, a styrene/maleic anhydride copolymer or an α-methlstyrene/styrene/acrylonitrile-, a styrene/acrylonitrile/methylmethacrylate-, a styrene/acrylonitrile/maleic anhydride or a styrene/acrylonitrile/acrylic acid terpolymer, or an α-methylstyrene/styrene/acylonitrile terpolymer. These copolymers may be used for the rigid component either individually or as mixtures so that the additional separately prepared rigid Component C of the mixtures according to this invention may, for example, be a mixture of a styrene/acrylonitrile copolymer and an α-methylstyrene/acrylonitrile copolymer. If the rigid components C of the materials according to this invention consist of a mixture of a styrene/acrylonitrile copolymer and an α-methylstyrene/acrylonitrile copolymer, the acrylonitrile content of the two copolymers should advantageously not differ from each other by more than 10 percent by weight, preferably not more than 5 percent by weight based on the copolymer.

The rigid Component C of the materials according to this invention can, however, also consist of a single styrene/acrylonitrile copolymer, namely in those cases where the grafting copolymerization for the preparation of Component B as well as for the preparation of the additional separately prepared rigid components are based on the same monomer mixture of styrene and acrylonitrile.

The additional separately prepared rigid Component C can be obtained employing traditional methods. Thus the copolymerization of styrene and/or α-methylstyrene with the acrylonitrile can be carried out in mass solution, suspension, or aqueous emulsion. The rigid Component (C) preferably has a viscosity number of 40 to 100, particularly of 50 to 80. The separately produced rigid Component C can be mixed with the product obtained by the copolymerization of the graft polymer mixture for the preparation of Component B to form the materials according to this invention in such a manner that part of rigid Component C is initially mixed with the graft Copolymer B and that the rest of rigid Component C is added only at this point. However, the materials can also be mixed in one step.

In order to prepare the thermoplastic molding materials, a preferred method is to intensively mix a melt of the rigid polymer C with the copolymerized graft polymer mixture A+B at temperatures above 200° C.

A preferred thermoplastic molding material has an elastomeric phase of butylacrylate and tricyclodecenylacrylate and is grafted with styrene and acrylonitrile in a ratio of 75 to 25 and is mixed with a styrene/acrylonitrile rigid component having an acrylonitrile portion of 35 percent.

Component B and C can be mixed in accordance with any of the known methods. If the components were prepared, for example, by emulsion polymerization, it is possible to mix the resultant polymer dispersions and to process the polymer mixture. Preferably, however, Components B and C are mixed by combined extrusion, kneading or rolling of the components. Prior to this it is necessary to isolate the components from the solution or aqueous dispersion resulting from the polymerization. It is also possible to only partially dewater the products of the grafting copolymerization obtained in an aqueous dispersion [Component B]and can be mixed with the rigid Component C as damp crumbs with complete drying of the copolymerizd graft polymer mixtures taking place during the mixing process.

Component D

As additional Component D, the mixtures of B and C according to this invention may contain additives such as are commonly used for ASA polymers. Examples therefore include: fillers, other compatible plastics, antistatics, antioxidants, flame retardants and lubricants. The additives are used in commonly applied amounts, preferably in amounts of 0.1 to a total of approximately 30 parts by weight based on 100 parts by weight of the mixture (A+B+C).

Surprisingly, it has been found that the materials according to this invention have very good dyeing properties and have the facility to achieve brilliant color shades with low amounts of pigment. Therefore, the materals according to this invention may contain as additives, d, particularly dyes or pigment in mixed form. The dyes or pigments are generally added to the mixture in amounts of approximately 0.02 to approximately 10 parts by weight, preferably of 0.2 to 5 parts, based on 100 parts by weight of the mixture in (A+B+C). Suitable dyes and pigments include: cadmium sulfide, copper-phthalocyanine, iron oxides and fine particle lamp black. The molded parts prepared from these dyed matrials give an excellent color impression with brilliant and bright color shades being possible without any clouding or gray haze. The molded parts prepared from the dyed materials by way of injection molding surprisingly have essentially no different color shades in the date or flowline areas as can otherwise be observed to a very great extent in the injection molding of dyed ASA polymers based on small particle copolymerized graft polymers of Component B. The materials according to this invention which are processed by means of injection molding, on the other hand, show good color uniformity in the gate areas and in the flow line vicinity. Even in the case of undyed molding materials, flow line markings cannot be discerned. In addition to good dyeing properties, the materials according to this invention also have greatly improved notch impact resistance when compared with known ASA polymers. As shown by the examples below, the notch impact resistance of the mixtures according to this invention lies far above the corresponding values of the individual components. It is also found that the impact resistance after weathering remains at a high level and that the molding materials have satisfactory mechanical properties even after sustaining weathering damage.

The materials according to this invention may be processed in accordance with methods normally used for processing thermoplatic, such as extrusion and injection molding, to result in the most diverse molded parts such as outdoor furniture, boats, signs, street light covers and toys. As previously mentioned, the materials according to this invention are particularly well suited for the preparation of colored molded parts of the referenced type such as are used particularly for garden chairs, children's toys and signs.

The physical properties described in this application were determined as follows:

1. The average particle size in every case refers to the weight average of the particle size as determined by way of an analytical ultracentrifuge corresponding to the method by W. Scholtan and H. Lange, Kolloid-Z. and Z. Polymere 250 (1972) pages 782 through 796. The ultracentrifuge measurement provides the integral mass distribution of the particle diameter of a sample. This provides the percentage by weight of the particles which have a diameter equal to or less than a certain size. The average particle diameter which is also referred to as the $d_{50}$ value of the integral mass distribution is defined as the particle diameter at which 50 percent by weight of the particles have a smaller diameter than the diameter corresponding with the $d_{50}$ value. By the same token, 50 percent by weight of the particles will then have a larger diameter than the $d_{50}$ value. In order to characterize the spread of the particle size distribution of the rubber particles, the $d_{10}$ and $d_{90}$ values which are obtained from the intergral mass distribution, are used in addition to the $d_{50}$ value (average particle diameter). The $d_{10}$ or $d_{90}$ value of the integral mass distribution is defined along the lines of the $d_{50}$ value with the difference that these values are based on 10 to 90 percent by weight of the particles. The quotient $$\frac{d_{90} - d_{10}}{d_{50}} = Q$$

represents a measure of the distribution of the particle size.

2. The impact resistance and notch impact resistance in [KJ/m2] of the products was measured in accordance with DIN 53 453 at room temperature of 23° C. using standard small rods injected at 250° C. The impact resistances of the test samples are compiled in Table 1.

3. The weathering tests were carried out in the Xeno Test 1200 using nonstabilized material. The impact resistance during the exposure to light was recorded particularly beyond the steep reduction of the tanacity caused by ultraviolet irradiation.

4. The viscosity values np/c in $(cm^{3} \times g^{-1})$ were determined by using a 0.5 percent solution in methylethylketone. Prior to the measurement, insoluble gel components were removed by centrifuging and were taken into consideration when weighing the entire polymer.

5. The dyeability was evaluated visually using dyed molded parts produced by injectin molding. In order to dye the materials, 0.3 percent by weight of ultramarine blue was added in all cases. The dyeability was graded as follows, based on the resultant color impression.
Grade 1: pure, brilliant and clear
Grade 2: somewhat dull, slightly hazy
Grade 3: dirty and dull, very hazy 6. The flow line marking was also evaluated visually using molded parts produced by injection molding. The parts were not dyed. The grades were as follows:
Grade 1: no flow line marking
Grade 2: flow line barely recongnizable
Grade 3: pronounced flow line The invention is explained in greater détail by the Examples below. Unless otherwise noted, the parts and percentages referred to in the Examples are parts and percentages by weight.

EWAMPLES

Preparation of a basic rubber, Component A1:

A mixture of 16 parts of butylacrylate and 0.4 parts of tricyclodecenylacrylate in 150 parts of water were heated to 60° C. while being stirred and while adding 0.5 parts of the sodium salt of $C_{12}$ to $C_{18}$ paraffin sulfonic acid, 0.3 parts of potassium persulfate, 0.3 parts sodium hydrogen carbonate, and 0.15 parts sodium pyrophosphate. Ten minutes after the start of the polymerization reaction, a mixture of 82 parts of butylacrylate and 1.6 parts of tricyclodecenylacrylate were added within a period of three hours. After completing the monomer addition the mixture was allowed to react for an additional hour. The resultant latex of the crosslinked butylacrylate polymers had a solids content of 40 percent by weight. The average particle size (weight average) was determined to be 216 nanometers, the particle size distribution was narrow (Quotient Q=0.29).

Preparation of a basic rubber, Component A2:

After adding 50 parts of water and 0.1 part of potassium persulfate to 2.5 parts of the latex prepared in accordance with Example 1 (Component A), a mixture of 49 parts of butylacrylate and 1 part of tricyclodecenylacrylate and a solution of 0.5 parts of the sodium salt of a $C_{12}$–$C_{18}$ paraffin sulfonic acid in 25 parts of water were added at 60° C. during a period of 3 hours. After completing the addition, the mixture was postpolmerized for 2 hours. The resultant latex of the crosslinked butylacrylate polymer had a solids content of 40 percent. The average particle size (weight average) of the latex was determined to be 410 nanometers. The particle size distribution was narrow. (Q=0.1).

Preparation of the graft rubber, Component B1:

An amount of 150 parts of the polybutylacrylate latex prepared in accordance with (A) were mixed with 20 parts of styrene and 60 parts of water and after adding an additional 0.03 parts of potassium persulfate and 0.05 parts lauroyl peroxide the mixture was heated to 65° C. while being stirred for a period of 3 hours. After completing the first stage of the grafting copolymerization, the copolymerized graft polymer mixture had a grafting degree of 17 percent. Without other additives this copolymerized graft polymer dispersion was polymerized with 20 parts of a mixture of styrene and acrylonitrile (ratio 75:25) for another 3 hours. After completing the grafting copolymerization the product was precipitated from the dispersion by means of a calcium chloride solution at a temperature of 95° C., was washed with water, and was dried in a warm air stream. The degree of grafting of the copolymerized graft polymer mixture was 35 percent.

Preparation of graft rubber, Component B2:

An amount of 150 parts of the latex A1 were mixed with 20 parts of styrene and 60 parts of water, and while being stirred were heated to 65° C. during a period of 3 hours after adding an additional 0.03 parts of potassium persulfate and 0.05 parts of lauroyl peroxide. The dispersion resulting from this graft copolymerization was then polymerized with 20 parts of a mixture of styrene and acrylonitrile in a ration of 75 : 25 for an additional 4 hours. The reaction product was then precipitated from the dispersion by way of a calcium choride solution at 95° C., was washed with water, and was dried in a warm air stream. The degree of grafting of the copolymerized graft polymer mixture was determined to be 35 percent.

Preparation of the rigid component, Component C:

A monomer mixture of styrene and acrylonitrile was polymerized in solution under commonly used conditions. The resultant styrene/acrylonitrile copolymer had an acrylonitrile content of 35 percent and a viscosity value of 80 milliliters/gram.

EXAMPLE 1

Preparation of Mixtures:

The precipitated and dried copolymerized graft polymer mixture B1 was mixed with the rigid component in an extruder at a temperature of 260° C. in such a manner that the resultant mixture had a graft rubber content of 25 percent by weight. 1% of a lubricant (diethylphthalate) and the dye were added to the mixing extruder when mixing the polymers. The properties of the mixtures listed in the table below were determined by using molded parts prepared by injection molding from these mixtures.

EXAMPLE 2

The styrene/acrylonitrile copolymer described in Example 1 was used as rigid Component C. Components B2 and C were mixed as described in Example 1. A corresponding amount of additive was used.

EXAMPLE 3

The graft rubber B2, described in Example 2, was mixed with an α-methylstyrene-acrylonitrile copolymer containing 30 percent by weight of acrylonitrile and having a viscosity value of 59 milliliters per gram in such a manner that the resultant polymer contained 20 percent by weight of a graft rubber.

EXAMPLE 4

The procedure as described in Example 1 was employed except that a mixture of styrene/acrylonitrile/methylmethacrylate in a ratio of 70:20:10 was used as Component B for the second grafting shell and a terpolymer of styrene/acrylonitrile and methylmethacrylate (70:20:10) with a viscosity value of 70 milliliters per gram was used as rigid Component (C).

EXAMPLE 5

The graft rubber B2 of Example 2 was mixed with a rigid Component (C) consisting of a styrene/acrylonitrile/malaeic anhydride terpolymer (monomer ratio 70:20:10) having a viscosity value of 70 milliliters per gram in such a manner that the mixture contained 25 percent by weight of graft rubber.

COMPARISON EXAMPLE A

An amount of 150 parts of the basic rubber of Example 1 were mixed with 40 parts of a mixture of styrene and acrylonitrile in a ratio of 70:25 and 60 parts of water and after adding an additional 0.03 parts of potassium persulfate and 0.05 parts of lauroylperoxide, the mixture was heated to 65° C. while being stirred for a period of 4 hours. As described in Example 1, the dispersion was processed and was mixed with the rigid Component C described in Example 1 in such a manner that a graft rubber content of 25 percent by weight resulted.

COMPARISON EXAMPLE B

An amount of 150 parts of basic rubber A described in Example 2 were mixed with 40 parts of a mixture of styrene and acrylonitrile in a ratio of 75:25 and 60 parts of water and after adding an additional 0.03 parts of potassium persulfate and 0.05 parts of lauroylperoxide, the mixture was heated to 65° C. while being stirred for a period of hours. The method for processing and mixing was described in Example 2.

TABLE

| Example | Notch Impact Resistance 280° C. [KJ/m$^2$] after exposure to weathering in the Xeno Test for 150 hours | Impact Resistance [/m$^2$] | Dyeability | Flow line Marking |
|---|---|---|---|---|
| 1 | 28 | 30 | 1 | 2 |
| 2 | 36 | 35 | 1 | 1 |
| 3 | 32 | 34 | 1 | 1 |
| 4 | 38 | 36 | 1 | 2 |
| 5 | 28 | 28 | 1 | 1 |
| Comparison Examples (not in accordance with this invention) | | | | |
| A | 18 | 15 | 2 | 3 |
| B | 25 | 20 | 3 | 2 |

The embodiments of the invention in which an exclusive property or privilege is claimed are defined as follows:

1. A thermoplastic molding material consisting of
   (A) 1 to 25 percent by weight based on the weight of A+B+C of at least one elastomeric polymer which has a glass temperature, Tg, of less than 0° C. and consists of:
      (1) 50 to 99.9 percent by weight of at least one alkyl acrylate having 1 to 8 carbon atoms in the alkyl radical
      (2) 0.1 to 5 percent by weight of a polyfunctional monomer having a crosslinking effect and
   (B) 5 to 40 percent by weight based on the weight of A+B+C of a shell grafted to the elastomeric polymer A, the graft polymer having an average particle size of 200 to 750 nm ($d_{50}$—value of the integral mass distribution) wherein the polymerization of the grafted shell consisting of (B) takes place in two stages with 30 to 70 percent by weight of a monomer (B1) selected from the group consisting of styrene, α-methylstyrene para-methylstyrene and tertiary butylstyrene in the first stage and 30 to 70 percent by weight of a mixture of the monomer (B1) and a monomer (B2) selected from the group consisting of ethylacrylate and methylacrylate in a weight ratio of 90:10 to 60:40 in the second stage and
   (C) 35 to 94 percent by weight based on the weight of A+B+C of a copolymer consisting of a styreneacrylonitrile copolymer.

2. The thermoplastic molding material of claim 1 wherein (A)(2) is selected from the group consisting of divinylbenzene, diallylmaleate, diallylfumarate, diallylphthalate and the acrylate ester of tricyclodecenylalcohol.

3. A thermoplastic molding material consisting of
   (A) 1 to 25 percent by weight based on the weight of A+B+C of at least one elasatomeric polymer which has a glass temperature, Tg, of less than 0° C. and consists of:
      (1) 50 to 99.9 percent by weight of a least one alkyl acrylate having 1 to 8 carbon atoms in the alkyl radical
      (2) 0.1 to 5 percent by weight of a polyfunctional monomer having a crosslinking effect
      (3) 20 to 30 percent by weight of butadiene;
   (B) 5 to 40 percent by weight based on the weight of A+B+C of a shell grafted to the elastomeric polymer A, the grat polymer having an average particle size of 200 to 750 nm ($d_{50}$—value of the integral mass distribution) wherein the polymerization of the grafted shell consisting of (B) takes place in two stages with 30 to 70 percent by weight of a monomer (B1) selected from the group consisting of styrene, α-ethylstyrene para-methylstyrene and tertiary butylstyrene in the first stage and 30 to 70 percent by weight of a mixture of the monomer (B1) and a monomer (B2) selected from the group consisting of ethylacrylate and methylacrylate in a weight ratio of 90:10 to 60:40 in the second stage; and
   (C) 35 to 94 percent by weight based n the weight of A+B+C of a copolymer consisting of a styreneacrylonitrile copolymer.

* * * * *

UNITED STATES PATENT AND TRADEMARK OFFICE
CERTIFICATE OF CORRECTION

PATENT NO. : 4,788,253

DATED : Nov. 29, 1988

INVENTOR(S) : JUERGEN HAMBRECHT, BURGHARD SCHMITT, JOHANN SWOBODA, GEORG WASSMUTH, CLAUS BERNHARD, RUDOLF STEPHAN

It is certified that error appears in the above-identified patent and that said Letters Patent is hereby corrected as shown below:

Column 12, Claim 3, line 5, correct spelling of elasatomeric to "elastomeric".

Column 12, Claim 3, line 29, change "n" to -- on --.

Signed and Sealed this

Twenty-third Day of May, 1989

Attest:

DONALD J. QUIGG

Attesting Officer

Commissioner of Patents and Trademarks